(12) United States Patent
Joslyn

(10) Patent No.: US 7,479,078 B2
(45) Date of Patent: Jan. 20, 2009

(54) BELT TENSIONER SYSTEM

(75) Inventor: Robert C. Joslyn, Nixa, MO (US)

(73) Assignee: Dayco Products, LLC, Miamisburg, OH (US)

( * ) Notice: Subject to any disclaimer, the term of this patent is extended or adjusted under 35 U.S.C. 154(b) by 604 days.

(21) Appl. No.: 10/991,661

(22) Filed: Nov. 17, 2004

(65) Prior Publication Data

US 2006/0105870 A1    May 18, 2006

(51) Int. Cl.
*F16H 7/12* (2006.01)

(52) U.S. Cl. ...................................... 474/133; 474/117

(58) Field of Classification Search ................. 474/133, 474/134, 135, 117; 198/810.04, 813, 810.03
See application file for complete search history.

(56) References Cited

U.S. PATENT DOCUMENTS

| | | | |
|---|---|---|---|
| 976,115 A | 11/1910 | Bard | |
| 1,848,423 A | 3/1932 | Jackson | |
| 2,766,417 A | 10/1956 | Merritt | |
| 3,136,169 A * | 6/1964 | Karger et al. | 474/23 |
| 3,834,477 A | 9/1974 | Sandow | |
| 3,926,063 A * | 12/1975 | Mayfield | 474/132 |
| 4,069,719 A | 1/1978 | Cancilla | |
| 4,416,647 A | 11/1983 | White, Jr. | |
| 4,758,208 A | 7/1988 | Bartos et al. | |
| 4,767,383 A * | 8/1988 | St. John | 474/133 |
| 4,768,997 A | 9/1988 | Page et al. | |
| 5,131,889 A | 7/1992 | Meckstroth et al. | |
| 5,797,819 A * | 8/1998 | Arai | 474/161 |
| 6,167,686 B1 | 1/2001 | Becker et al. | |
| 6,689,001 B2 | 2/2004 | Oliver et al. | |
| 2002/0039944 A1 | 4/2002 | Ali et al. | |
| 2002/0086751 A1 | 7/2002 | Bogner et al. | |

FOREIGN PATENT DOCUMENTS

| | | |
|---|---|---|
| DE | 4243451 | 6/1994 |
| DE | 19926612 | 12/2000 |
| JP | 04-059459 | 2/1992 |
| JP | 06-094090 | 4/1994 |
| WO | 00/77421 | 12/2000 |
| WO | 00/77422 | 12/2000 |

* cited by examiner

*Primary Examiner*—Richard W L Ridley
*Assistant Examiner*—Terence Boes
(74) *Attorney, Agent, or Firm*—Joseph V. Tassone; Thompson Hine LLP

(57) ABSTRACT

A belt tensioner system includes a belt tensioner and a bumper idler pulley. The belt tensioner includes an arm which is adapted to be rotatably-biased and includes a tensioner idler pulley which is supported by the arm and which travels in an arcuate path when the arm rotates. The bumper idler pulley is positioned at least partially in the arcuate path to stop the travel of the tensioner idler pulley when the arm rotates to a predetermined rotational position. In one application, the belt tensioner system is for an automotive vehicle.

19 Claims, 2 Drawing Sheets

BELT TENSIONER SYSTEM

TECHNICAL FIELD

The present invention relates generally to tensioning devices, and more particularly to a belt tensioner system.

BACKGROUND OF THE INVENTION

The automotive industry utilizes belt tensioners to create a generally constant tension on a closed-loop belt as it elongates with wear, wherein the belt is driven by the crankshaft pulley attached to the crankshaft of the engine and wherein the belt rotates two or more driven pulleys each operating an automotive accessory. In known designs, the belt tensioner includes a base secured to the engine, an arm which is adapted to be rotatably-biased and which is rotatably attached to the base, and a tensioner idler pulley which is supported by the arm and which is rotatable about the axis of the tensioner idler pulley. In one known example, the base is a spring case containing a torsion spring which interacts with the spring case and the arm. The arm is rotationally biased (preloaded through spring action) by twisting the arm relative to the base. The tensioner idler pulley on the arm is then placed against the belt. As the belt lengthens under wear, the torque from the preloaded spring continues to cause the tensioner idler pulley of the arm to apply pressure against the belt keeping the belt in tension. The operation of belt tensioners is well known.

Known designs of certain belt tensioners (such as that disclosed in U.S. Pat. No. 6,689,001) include modifying the base of the belt tensioner to include a stop which is located on the base to limit the rotational movement of the arm by contacting a bushing on the arm when the arm rotates towards the stop. Tensioners of this sort are especially useful in drives with combination starter/alternators or other accessories that create excessive belt tension variation.

Still, scientists and engineers continue to seek improved belt tensioners.

SUMMARY OF THE INVENTION

A first expression of an embodiment of the invention is for a belt tensioner system including a belt tensioner and a bumper idler pulley. The belt tensioner includes an arm which is adapted to be rotatably-biased and includes a tensioner idler pulley which is supported by the arm and which travels in an arcuate path when the arm rotates. The bumper idler pulley is positioned at least partially in the arcuate path to stop the travel of the tensioner idler pulley when the arm rotates to a predetermined rotational position.

A second expression of an embodiment of the invention is for a belt tensioner system including a belt tensioner, a bumper idler pulley, and a closed-loop belt. The belt tensioner includes an arm which is adapted to be rotatably-biased and includes a tensioner idler pulley which is supported by the arm and which travels in an arcuate path when the arm rotates. The bumper idler pulley is positioned at least partially in the arcuate path to stop the travel of the tensioner idler pulley when the arm rotates to a predetermined rotational position, and is unsupported by the belt tensioner. The closed-loop belt rotates the tensioner idler pulley.

A third expression of an embodiment of the invention is for a belt tensioner system for an automotive vehicle having an engine crankshaft pulley. The belt tensioner system includes a belt tensioner, a bumper idler pulley, and a closed-loop belt. The belt tensioner includes an arm which is adapted to be rotatably-biased and includes a tensioner idler pulley which is supported by the arm and which travels in an arcuate path when the arm rotates. The bumper idler pulley is positioned at least partially in the arcuate path to stop the travel of the tensioner idler pulley when the arm rotates to a predetermined rotational position, and is unsupported by the belt tensioner. The closed-loop belt is operatively connected to the engine crankshaft pulley and rotates the tensioner idler pulley, wherein the tensioner idler pulley engages the belt upstream of the engine crankshaft pulley, and wherein the only other pulley or pulleys, if any, engaging the belt upstream of the engine crankshaft pulley, and between the engine crankshaft pulley and the tensioner idler pulley, are idler pulleys.

Several benefits and advantages are derived from one or more of the expressions of an embodiment of the invention. In one example, having a bumper idler pulley which is unsupported by the belt tensioner and which is positioned to limit travel of the tensioner idler pulley (and hence limit travel of the arm supporting the tensioner idler pulley) avoids adding structure and cost associated with conventionally integrating a stop into the belt tensioner base. In the same or a different example, having a bumper idler pulley which is unsupported by the belt tensioner and which is positioned to limit travel of the tensioner idler pulley (and hence limit travel of the arm supporting the tensioner idler pulley) allows use in automotive vehicle designs wherein certain packaging constraints prevent conventionally integrating a stop into the belt tensioner base.

DETAILED DESCRIPTION

Figure 1:
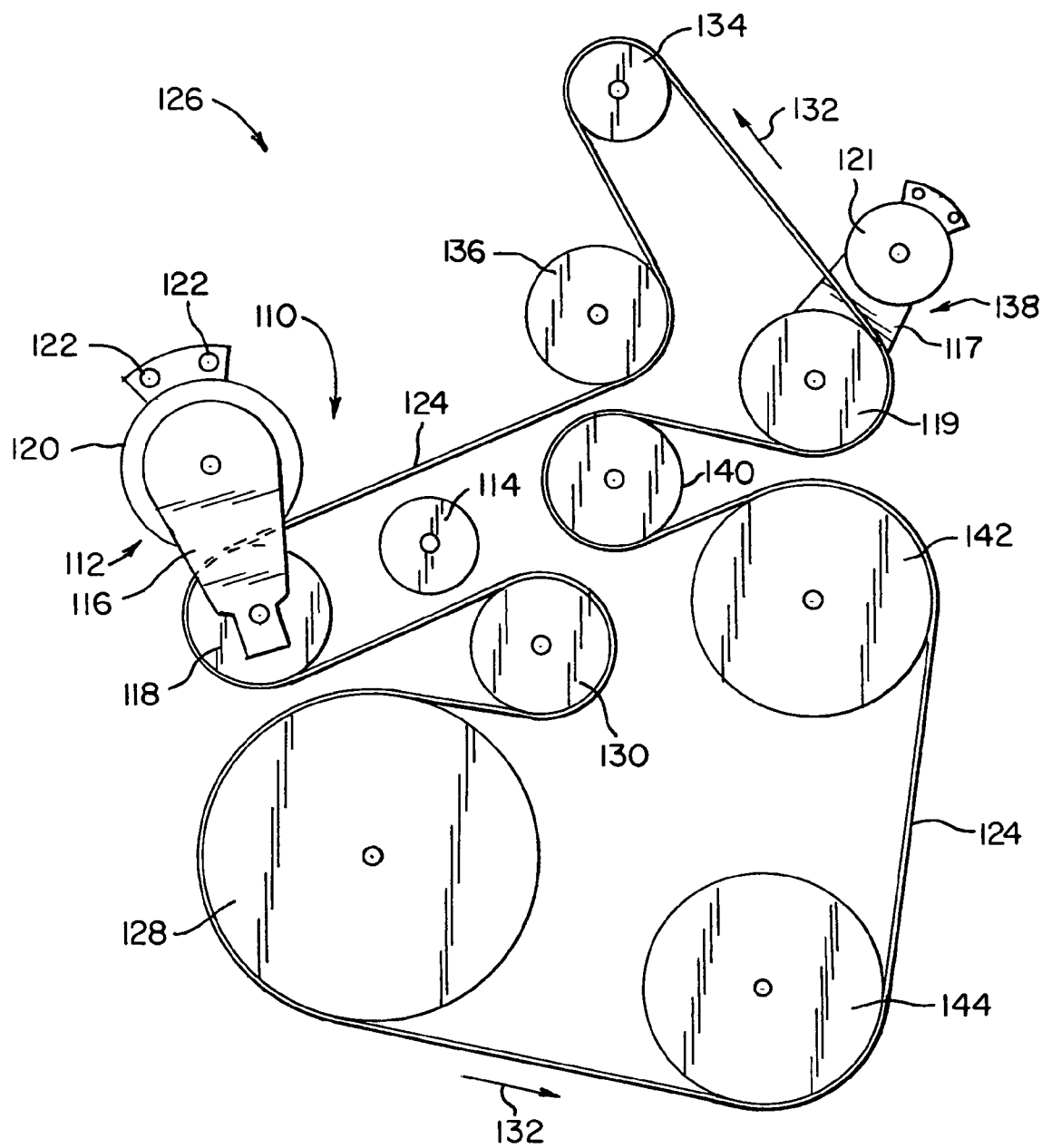
FIG. 1 is a schematic front elevational view of a first embodiment of a belt tensioner system of the invention wherein the bumper idler pulley is located inside the closed-loop belt.

Referring now to the drawings, FIG. 1 illustrates a first embodiment of the present invention. A first expression of the embodiment shown in FIG. 1 is for a belt tensioner system 110 including a belt tensioner 112 and a bumper idler pulley 114. The belt tensioner 112 includes an arm 116 which is adapted to be rotatably-biased and includes a tensioner idler pulley 118 which is supported by the arm 116 and which travels in an arcuate path when the arm 116 rotates. The bumper idler pulley 114 is disposed at least partially in the arcuate path to stop the travel of the tensioner idler pulley 118 when the arm 116 rotates to a predetermined rotational position.

It is noted that the tensioner idler pulley 118 has a longitudinal axis and is rotatable about its longitudinal axis. Likewise, it is noted that the bumper idler pulley 114 has a longitudinal axis and is rotatable about its longitudinal axis.

In one construction of the first expression of the embodiment of FIG. 1, the belt tensioner 112 includes a base 120 having mounting holes 122 for securing the base 120 to an appropriate structure (not shown). In one variation, the base 120 is a spring case containing a torsion spring (not shown) which interacts with the spring case and the arm 116. It is noted that the arm 116 shown in FIG. 1 is rotatably biased in a clockwise direction to a rotational position in which the tensioner idler pulley 118 does not contact the bumper idler pulley 114.

In one application of the first expression of the embodiment of FIG. 1, the bumper idler pulley 114 is an elastomeric bumper idler pulley. In one variation, the bumper idler pulley 114 is unsupported by the belt tensioner 112 such as by not being a part of, and by not being attached to, the belt tensioner 112. In one modification, the arm 116 has either an increased or decreased rotational bias when rotated to the predetermined rotational position. In one construction, an increased rotational bias means that the torsion spring exerts a stronger spring force when the arm 116 is rotated to the predetermined rotational position. In one application, the arm 116 has an increased rotational bias when rotated to the predetermined rotational position. In this application, the predetermined rotational position of the arm 116 in the embodiment of FIG. 1 would be a position to which the arm 116 would counterclockwise rotate wherein the tensioner idler pulley 118 would contact (and rotate) the bumper idler pulley 114. Such counterclockwise rotation of the arm 116 could occur during a transient condition, as can be appreciated by those skilled in the art.

A second expression of the embodiment of FIG. 1 is for a belt tensioner system 110 including a belt tensioner 112, a bumper idler pulley 114, and a closed-loop belt 124. The belt tensioner 112 includes an arm 116 which is adapted to be rotatably-biased and includes a tensioner idler pulley 118 which is supported by the arm 116 and which travels in an arcuate path when the arm 116 rotates. The bumper idler pulley 114 is disposed at least partially in the arcuate path to stop the travel of the tensioner idler pulley 118 when the arm 116 rotates to a predetermined rotational position. The bumper idler pulley 114 is unsupported by the belt tensioner 112. The closed-loop belt 124 rotates the tensioner idler pulley 118.

In one application of the second expression of the embodiment of FIG. 1, the bumper idler pulley 114 is an elastomeric bumper idler pulley. In one modification, the arm 116 has either an increased or decreased rotational bias when rotated to the predetermined rotational position. In one application, the arm 116 has an increased rotational bias when rotated to the predetermined rotational position. In this application, the predetermined rotational position of the arm 116 in the embodiment of FIG. 1 would be a position to which the arm 116 would counterclockwise rotate wherein the tensioner idler pulley 118 would contact (and rotate) the bumper idler pulley 114. Such counterclockwise rotation of the arm 116 could occur during a transient condition which tightens the belt 124, as can be appreciated by those skilled in the art.

In one enablement of the second expression of the embodiment of FIG. 1, the tensioner idler pulley 118 has a plane of belt loading, the bumper idler pulley 114 has a centroid, and the centroid is disposed proximate the plane of belt loading. In one variation, the centroid lies substantially in the plane of belt loading. It is noted that if FIG. 1 were described as a cross-sectional view wherein the cutting plane (i.e., the sheet of paper containing FIG. 1) is the plane of belt loading, then the centroid would be the center of the circle of the bumper idler pulley 114 of FIG. 1, as is understood by those skilled in the art.

A third expression of the embodiment of FIG. 1 is for a belt tensioner system 110 for an automotive vehicle 126 having an engine crankshaft pulley 128 and includes a belt tensioner 112, a bumper idler pulley 114, and a closed-loop belt 124. The belt tensioner 112 includes an arm 116 which is adapted to be rotatably-biased and includes a tensioner idler pulley 118 which is supported by the arm 116 and which travels in an arcuate path when the arm 116 rotates. The bumper idler pulley 114 is disposed at least partially in the arcuate path to stop the travel of the tensioner idler pulley 118 when the arm 116 rotates to a predetermined rotational position. The bumper idler pulley 114 is unsupported by the belt tensioner 112. The closed-loop belt 124 is operatively connected to the engine crankshaft pulley 128 and rotates the tensioner idler pulley 118. The tensioner idler pulley 118 engages the belt 124 upstream of the engine crankshaft pulley 128, and the only other pulley or pulleys, if any, engaging the belt 124 upstream of the engine crankshaft pulley 128, and between the engine crankshaft pulley 128 and the tensioner idler pulley 118, are idler pulleys (such as idler pulley 130).

It is noted that an automotive vehicle is a self-propelled vehicle which travels on land on-road and/or off-road. It also is noted that the belt 124 moves in the direction indicated by arrows 132 and that such direction is from upstream to downstream. It is further noted that the portion of the moving belt 124 just upstream from the engine crankshaft pulley 128 is the portion of the moving belt 124 having the problem of the greatest belt slack and that such belt slack is addressed by the presence of the belt tensioner 112, as can be appreciated by the artisan.

In one application of the third expression of the embodiment of FIG. 1, the bumper idler pulley 114 is an elastomeric bumper idler pulley. In one enablement of the third expression of the embodiment of FIG. 1, the tensioner idler pulley 118 has a plane of belt loading, the bumper idler pulley 114 has a centroid, and the centroid is disposed proximate the plane of belt loading. In one variation, the centroid lies substantially in the plane of belt loading.

In one employment of the third expression of the embodiment of FIG. 1, the automotive vehicle 126 also has a starter-generator pulley 134 engaging the belt 124 upstream of the tensioner idler pulley 118, and the only other pulley or pulleys, if any, engaging the belt 124 upstream of the tensioner idler pulley 118, and between the tensioner idler pulley 118 and the starter-generator pulley 134, are idler pulleys (such as idler pulley 136). In one variation, the arm 116 has an increased rotational bias when rotated to the predetermined rotational position. In one modification, the bumper idler pulley 114 is disposed inside the belt 124 as shown in FIG. 1.

In one construction of the third expression of the embodiment of FIG. 1, the automotive vehicle 126 also includes an additional belt tensioner 138, an idler pulley 140, a power steering pulley 142, and an air conditioner pulley 144 as shown. The additional belt tensioner 138 includes an arm 117, a tensioner idler pulley 119, and a base 121. It is noted that FIG. 1 shows a rear view of the belt tensioner 112 and a front view of the additional belt tensioner 138. Implementations of the belt tensioner system 110 other than for an automotive vehicle 126 are left to the artisan.

Figure 2:
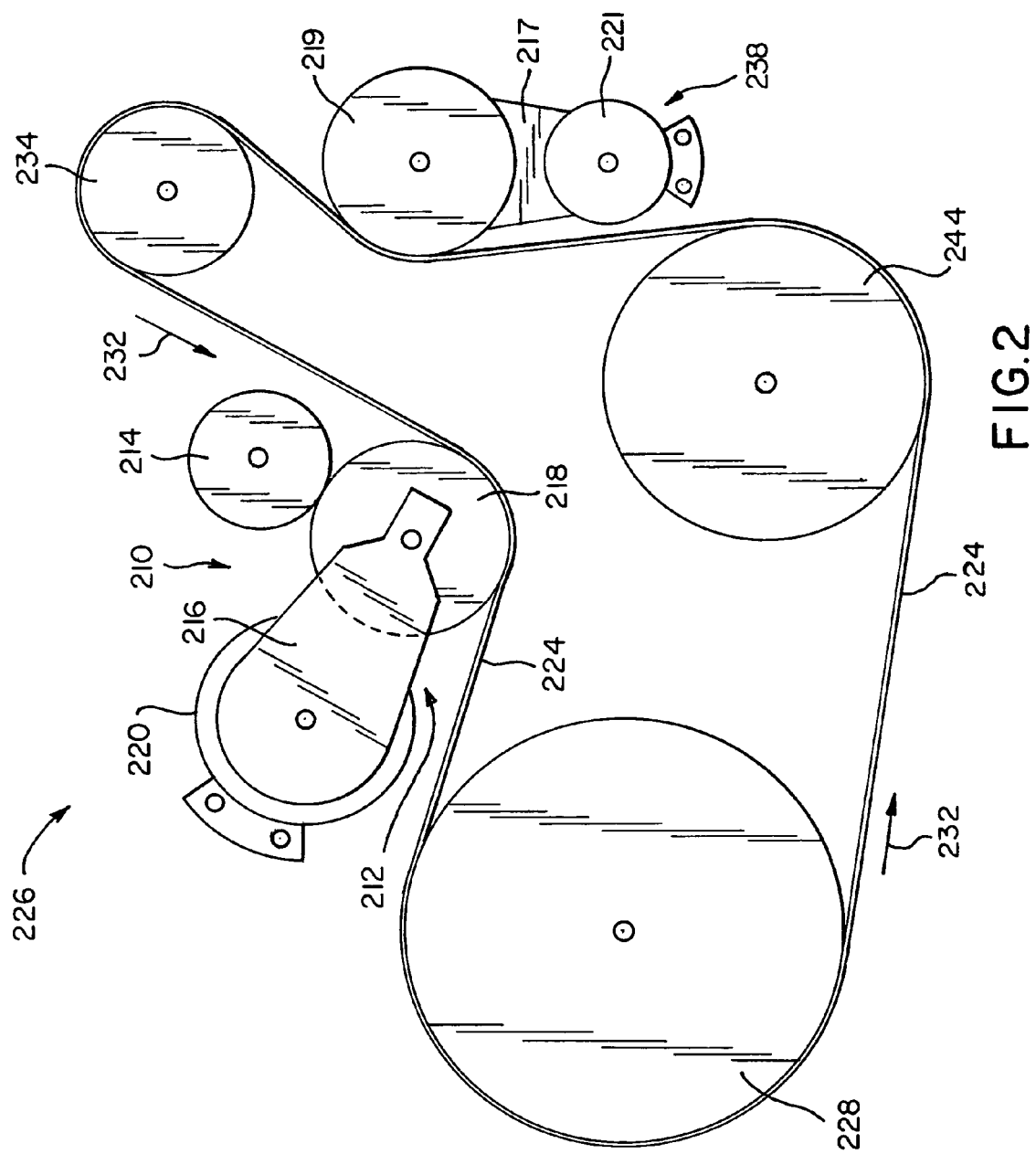
FIG. 2 is a schematic front elevational view of a second embodiment of a belt tensioner system of the invention wherein the bumper idler pulley is located outside the closed-loop belt.

Referring again to the drawings, FIG. 2 shows a second embodiment of the invention. A first expression of the embodiment of FIG. 2 is for a belt tensioner system 210 for an automotive vehicle 226 having an engine crankshaft pulley 228 and includes a belt tensioner 212, a bumper idler pulley 214, and a closed-loop belt 224 which moves in a direction indicated by arrow 232. The belt tensioner 212 has a base 220, an arm 216, and a tensioner idler pulley 218. In one variation, the bumper idler pulley 214 is disposed outside the belt 224. In one modification, the automotive vehicle 226 also has a starter-generator pulley 234, an additional belt tensioner 238, and an air conditioner pulley 244 as shown. The additional belt tensioner 238 includes an arm 217, a tensioner idler pulley 219, and a base 221. It is noted that FIG. 2 shows a rear view of the belt tensioner 212 and a front view of the additional belt tensioner 238. It is further noted that the arm 216 in FIG. 2 is shown as being at the predetermined rotational position wherein the bumper idler pulley 214 has stopped the travel of the tensioner idler pulley 218.

Several benefits and advantages are derived from one or more of the expressions of an embodiment of the invention. In one example, having a bumper idler pulley which is unsupported by the belt tensioner and which is positioned to limit travel of the tensioner idler pulley (and hence limit travel of the arm supporting the tensioner idler pulley) avoids adding structure and cost associated with conventionally integrating a stop into the belt tensioner base. In the same or a different example, having a bumper idler pulley which is unsupported by the belt tensioner and which is positioned to limit travel of the tensioner idler pulley (and hence limit travel of the arm supporting the tensioner idler pulley) allows use in automotive vehicle designs wherein certain packaging constraints prevent conventionally integrating a stop into the belt tensioner base.

The foregoing description of several expressions of two embodiments of the invention has been presented for purposes of illustration. It is not intended to be exhaustive or to limit the invention to the precise forms disclosed, and obviously many modifications and variations are possible in light of the above teaching. It is intended that the scope of the invention be defined by the claims appended hereto.

The invention claimed is:

1. A belt tensioner system comprising:
   a) a belt tensioner including a rotatable arm which is adapted to be rotatably-biased in a first rotational direction and including a tensioner idler pulley which is supported by the arm and travels in an arcuate path when the arm rotates; and
   b) a rotatable pulley bumper idler that selectively contacts the tensioner idler pulley, wherein said pulley bumper idler is disposed at least partially in the arcuate path of the tensioner idler pulley, wherein the arm is rotated in a second rotational direction to a predetermined rotational position at which the tensioner idler pulley contacts the pulley bumper idler, upon contact the pulley bumper idler stops the arcuate travel of the tensioner idler pulley.

2. The belt tensioner system of claim 1 wherein the pulley bumper idler is an elastomeric bumper idler pulley.

3. The belt tensioner system of claim 1, wherein the pulley bumper idler is unsupported by the belt tensioner.

4. The belt tensioner system of claim 3, wherein the arm has either an increased or decreased rotational bias when rotated to the predetermined rotational position.

5. The belt tensioner system of claim 4, wherein the arm has an increased rotational bias when rotated to the predetermined rotational position.

6. A belt tensioner system comprising:
   a) a belt tensioner including a rotatable arm which is adapted to be rotatably-biased in a first rotational direction and including a tensioner idler pulley which is supported by the arm and travels in an arcuate path when the arm rotates; and
   b) a rotatable pulley bumper idler that selectively contacts the tensioner idler pulley, wherein said pulley bumper idler is disposed at least partially in the arcuate path of the tensioner idler pulley, wherein the arm is rotated in a second rotational direction to a predetermined rotational position at which the tensioner idler pulley contacts the pulley bumper idler, upon contact the pulley bumper idler stops the arcuate travel of the tensioner idler pulley; and
   c) a closed-loop belt which rotates the tensioner idler pulley.

7. The belt tensioner system of claim 6, wherein the pulley bumper idler is an elastomeric bumper idler pulley.

8. The belt tensioner system of claim 6, wherein the arm has either an increased or decreased rotational bias when rotated to the predetermined rotational position.

9. The belt tensioner system of claim 8, wherein the arm has an increased rotational bias when rotated to the predetermined rotational position.

10. The belt tensioner system of claim 6, wherein the tensioner idler pulley has a plane of belt loading, wherein the pulley bumper idler has a centroid, and wherein the centroid is disposed proximate the plane of belt loading.

11. The belt tensioner system of claim 10, wherein the centroid lies substantially in the plane of belt loading.

12. A belt tensioner system for an automotive vehicle having an engine crankshaft pulley comprising:
    a) a belt tensioner including a rotatable arm which is adapted to be rotatably-biased in a first rotational direction and including a tensioner idler pulley which is supported by the arm and travels in an arcuate path when the arm rotates; and
    b) a rotatable pulley bumper idler that selectively contacts the tensioner idler pulley, wherein said pulley bumper idler is disposed at least partially in the arcuate path of the tensioner idler pulley, wherein the arm is rotated in a second rotational direction to a predetermined rotational position at which the tensioner idler pulley contacts the pulley bumper idler, upon contact the pulley bumper idler stops the arcuate travel of the tensioner idler pulley; and
    c) a closed-loop belt which is operatively connected to the engine crankshaft pulley and which rotates the tensioner idler pulley, wherein the tensioner idler pulley engages the belt upstream of the engine crankshaft pulley, and wherein the only other pulley or pulleys, if any, engaging the belt upstream of the engine crankshaft pulley, and between the engine crankshaft pulley and the tensioner idler pulley, are idler pulleys.

13. The belt tensioner system of claim 12, wherein the pulley bumper idler is an elastomeric bumper idler pulley.

14. The belt tensioner system of claim 13, wherein the tensioner idler pulley has a plane of belt loading, wherein the pulley bumper idler has a centroid, and wherein the centroid is disposed proximate the plane of belt loading.

15. The belt tensioner system of claim 14, wherein the centroid lies substantially in the plane of belt loading.

16. The belt tensioner system of claim 15, wherein the automotive vehicle also has a starter-generator pulley engaging the belt upstream of the tensioner idler pulley, and wherein the only other pulley or pulleys, if any, engaging the belt upstream of the tensioner idler pulley, and between the tensioner idler pulley and the staffer-generator pulley, are idler pulleys.

17. The belt tensioner system of claim 16, wherein the arm has an increased rotational bias when rotated to the predetermined rotational position.

18. The belt tensioner system of claim 17, wherein the pulley bumper idler is disposed inside the belt.

19. The belt tensioner system of claim 17, wherein the pulley bumper idler is disposed outside the belt.

* * * * *